United States Patent [19]
Baker et al.

[11] 3,919,529
[45] Nov. 11, 1975

[54] RADIO NAVIGATION SYSTEM
[75] Inventors: Donald H. Baker; Larry J. Bowe, both of Phoenix, Ariz.
[73] Assignee: Sperry Rand Corporation, New York, N.Y.
[22] Filed: Apr. 29, 1974
[21] Appl. No.: 465,228

[52] U.S. Cl. ..... 235/150.27; 235/150.2; 235/150.26
[51] Int. Cl.$^2$ ...................... G01S 7/44; G06F 15/50
[58] Field of Search....... 235/150.27, 150.2, 150.26; 343/112 R, 112 C; 244/77 C

[56] References Cited
UNITED STATES PATENTS

| | | | |
|---|---|---|---|
| 3,103,579 | 9/1963 | Green | 235/150.27 |
| 3,555,250 | 1/1971 | Curran | 235/150.27 |
| 3,659,291 | 4/1972 | Anthony | 235/150.27 |
| 3,776,455 | 12/1973 | Gee | 235/150.26 |

Primary Examiner—Malcolm A. Morrison
Assistant Examiner—Errol A. Krass
Attorney, Agent, or Firm—Howard P. Terry

[57] ABSTRACT

A radio aircraft navigation system employs radio guidance, altitude, air speed, and magnetic compass data for the generation of accurate craft positional data with respect to a radio guidance transmitter system. Computation of accurate northerly and easterly aircraft position data within the craft in the presence of wind is aided by a novel gain control and complementary filter system in which loop gains are functionally related to the prevailing flight mode. Dead reckoning operation is also enhanced should reliable radio guidance inputs be interrupted or unavailable.

30 Claims, 7 Drawing Figures

RADIO NAVIGATION SYSTEM

BACKGROUND OF THE INVENTION

1. Field of the Invention

The invention pertains to novel airborne computing apparatus permitting accurate and reliable in-flight navigation of aircraft with respect to ground-based guidance transmitter systems and more particularly relates to an airborne area navigation or RNAV computer system in which deleterious errors in the transmitted radio data and effects of wind are compensated using a novel position computer — complementary filter arrangement providing accurate instantaneous aircraft position data.

2. Description of the Prior Art

Aircraft navigation with respect to established radio guidance transmitter systems such as VOR/DME or VORTAC systems cooperating with airborne VOR and DME receivers has been practiced for many years, primarily in connection with guidance systems for control of aircraft to approach and to maintain a predetermined flight path or course. However, more recently, precision area navigation systems require greater accuracy in radio navigation position determination, particularly in crowded modern airways; improved dead reckoning is also required should the radio position data fail or become unusable.

In many prior art systems, accuracy of the received VOR data at large distances from the transmitter has not been sufficient due usually to short term errors in the radio data produced by the transmitter radiation pattern variations, by reflections, and by scattering of the transmitted energy, and the like. Filtering of the VOR data in the airborne receiver to reduce the effects of these errors has been attempted in the past, but undesirable signal lags and other problems such as the effects of wind are introduced. Further, the degree of filtering desired at large ranges, where VOR data errors are large, is unsuited for use in terminal areas providing proper compensation for wind shear effects usually accompanying large changes in altitude as the aircraft approaches the terminal area.

SUMMARY OF THE INVENTION

The invention is an automatic navigation computer system for aircraft employing radio, air speed, and magnetic compass data as its basic inputs for the accurate and reliable generation of instantaneous aircraft position with respect to a ground based radio guidance VOR/DME or VORTAC transmitter systems operating in cooperation with airborne VOR/DME navigational receivers. According to the invention, a navigation computing system including a gain controlling mechanism and a pair of complementary filter sub-systems is provided which accurately compares computed position data derived primarily from integration of components of craft true air speed and wind data to input radio position data to develop an error signal. The observed error is used to revise the derived wind data and to keep the positional output data in a currently accurate state. The effect or authority of the error on the computer loop is made directly proportional to craft air speed and inversely proportional to distance of the craft from the radio guidance transmitter system, maintaining optimum data filtering while the craft is enroute, while limiting the error signal reduces the effects of large random errors which may be present in the radio data. In the vicinity of the terminal area, the control is converted to be a function only of craft air speed for optimum system performance in that area.

DESCRIPTION OF THE PREFERRED EMBODIMENT

Figure 1:
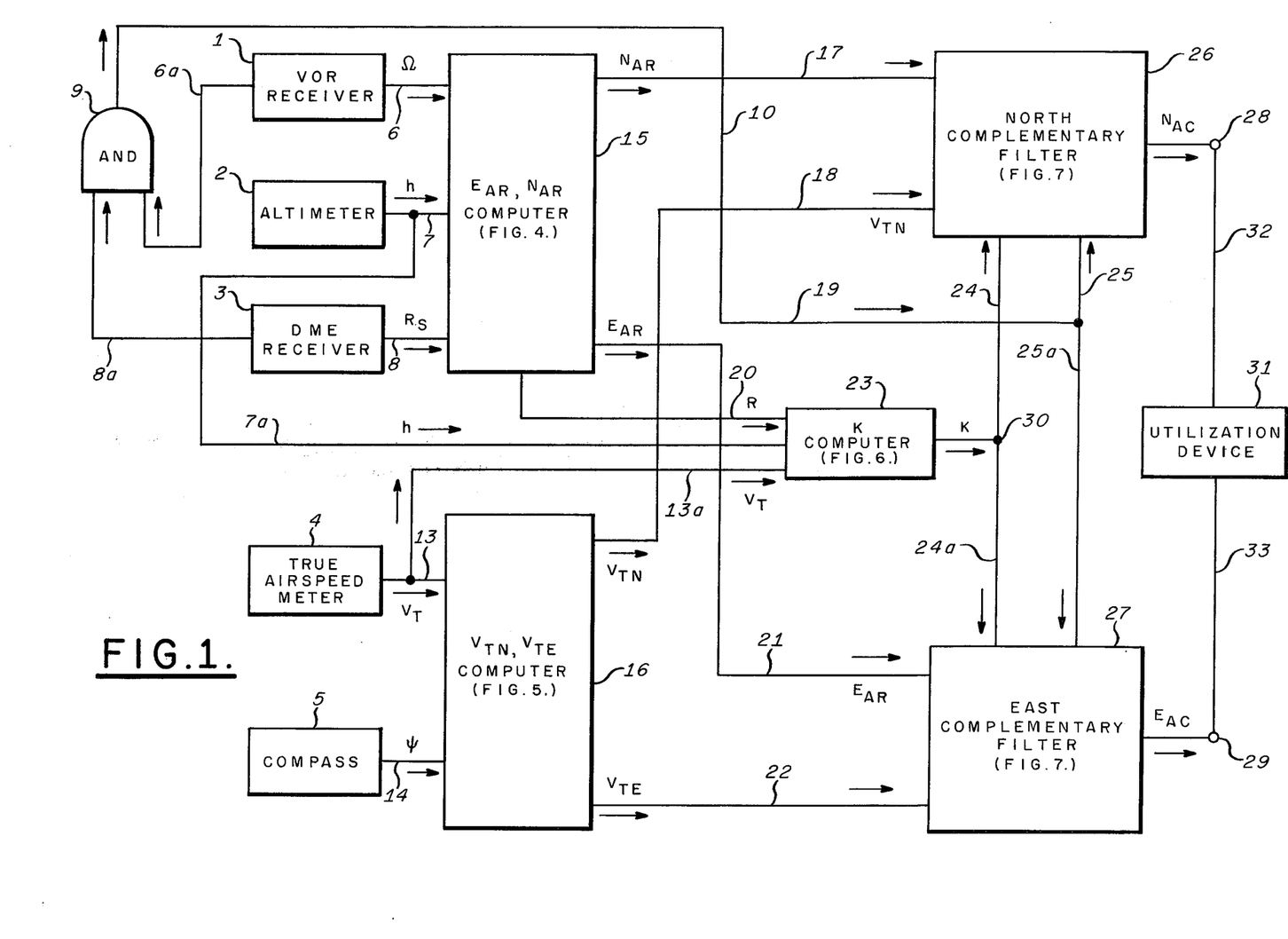
FIG. 1 is a block diagram of the airborne navigation system showing its component sub-systems and their electrical interconnections.
Figure 2:
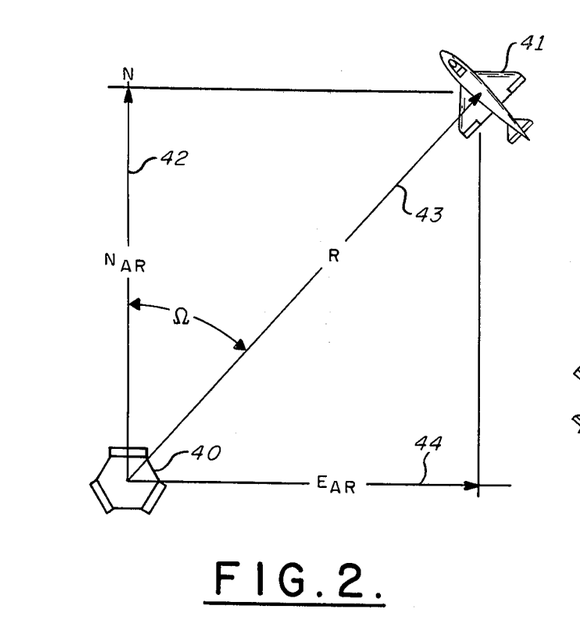
FIGS. 2 and 3 are vector diagrams useful in explaining the operation of the invention.
Figure 3:
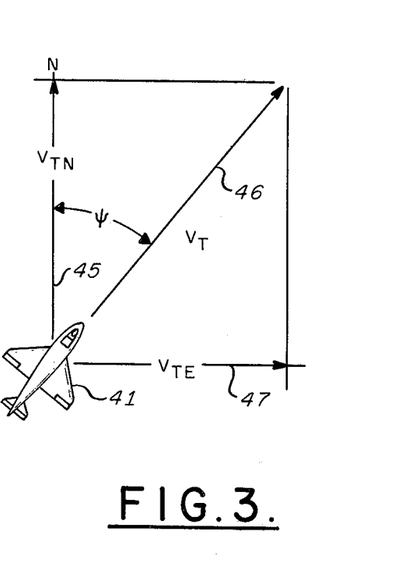

Referring particularly to FIGS. 1, 2 and 3, the amplitudes of the electrical signals that are used as inputs in the present invention are proportional to:

= radio bearing of the aircraft with respect to the north,
$h$ = aircraft altitude,
$R_s$ = slant range of the aircraft from the radio guidance transmitter,
$V_T$ = true air speed, and
= magnetic heading of the aircraft with respect to magnetic north, all in consistent units. Signals generated in operation within the invention have amplitudes proportional to:
$N_{AR}$ = northerly ground distance of the aircraft from the radio guidance transmitter,
$E_{AR}$ = easterly ground distance of the aircraft from the radio guidance transmitter,
$V_{TN}$ = craft magnetic north velocity,
$V_{TE}$ = craft magnetic east velocity,
$R$ = ground range of the aircraft from the radio guidance transmitter, and
$K$ = a computed gain parameter,
all in consistent units. The desired outputs of the novel navigation system are:
$N_{AC}$ = computed northerly position of the craft with respect to the radio guidance transmitter, and
$E_{AC}$ = computed easterly position of the craft with respect to the radio guidance transmitter.

FIG. 2 is illustrative of the geometry of the aircraft area navigation situation with respect to a radio guidance transmitter system 40 and an in-flight aircraft 41. A typical guidance transmitter system 40 will be equipped to radiate both VOR and DME transmissions receivable on aircraft 41. The arbitrarily illustrated craft 41 is defined by a range vector $R_s$ and the radio bearing angle . A measure of the range vector $R_s$ is obtained from the DME transmissions. It is converted to actual ground range $R$ within the $E_{AR}$, $N_{AR}$ computer 15. The craft radio bearing angle is obtained as usual within the airborne VOR receiver. The position of the aircraft is defined by a northerly distance $N_{AR}$ vector 42 and an easterly distance $E_{AR}$ vector 44. FIG. 3 shows the development with respect to the arbitrarily oriented aircraft 41 of the north and east components $V_{TN}$ and $V_{TE}$ of its true air speed $V_T$ vector 46 at the bearing angle with respect to the northerly direction.

The objectionable defects of the prior art trigonometric computation systems for deriving the magnitudes of northerly distance $N_{AR}$ and easterly distance $E_{AR}$ are overcome in the apparatus of FIG. 1, especially the undesired effects of computation errors due to errors in the original DME and VOR radio information. In FIG. 1, the principal signal inputs are derived from five conventional flight data sub-systems normally installed in instrumented aircraft. The VOR receiver 1 supplies the radio bearing signal via leads 6 to the $E_{AR}$, $N_{AR}$ computer 15, while the craft altitude signal $h$ is supplied from altimeter 2 via leads 7 and the slant range signal $R_s$ is supplied from the DME receiver 3 via leads 8 to the same computer 15; the latter computer 15 will be discussed in further detail with reference to FIG. 4. The altimeter 2 also supplies a signal proportional to altitude $h$ via lead 7a to the K computer 23 yet to be described in connection with FIG. 6.

Figure 5:
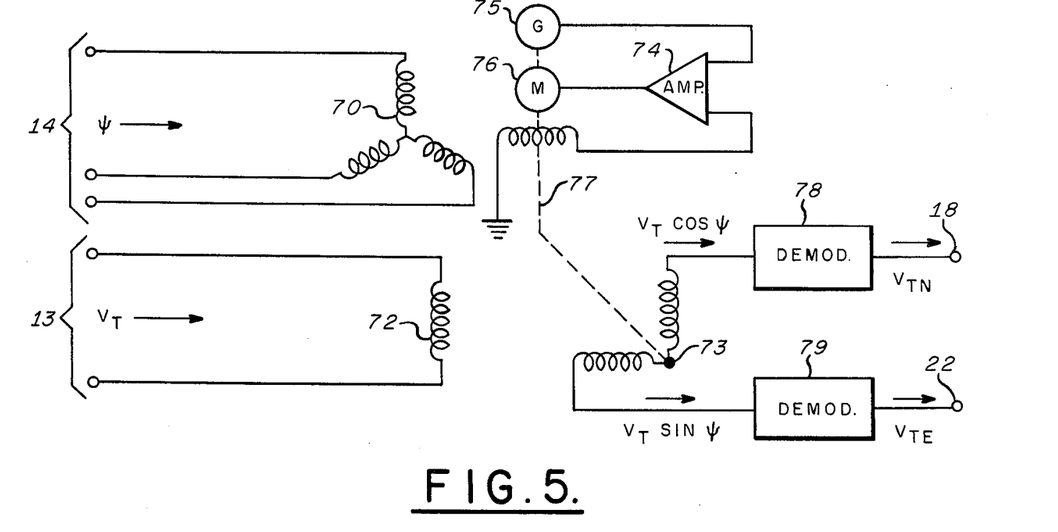
FIG. 5 is a detailed wiring diagram of the computer 16 of FIG. 1.
Figure 6:
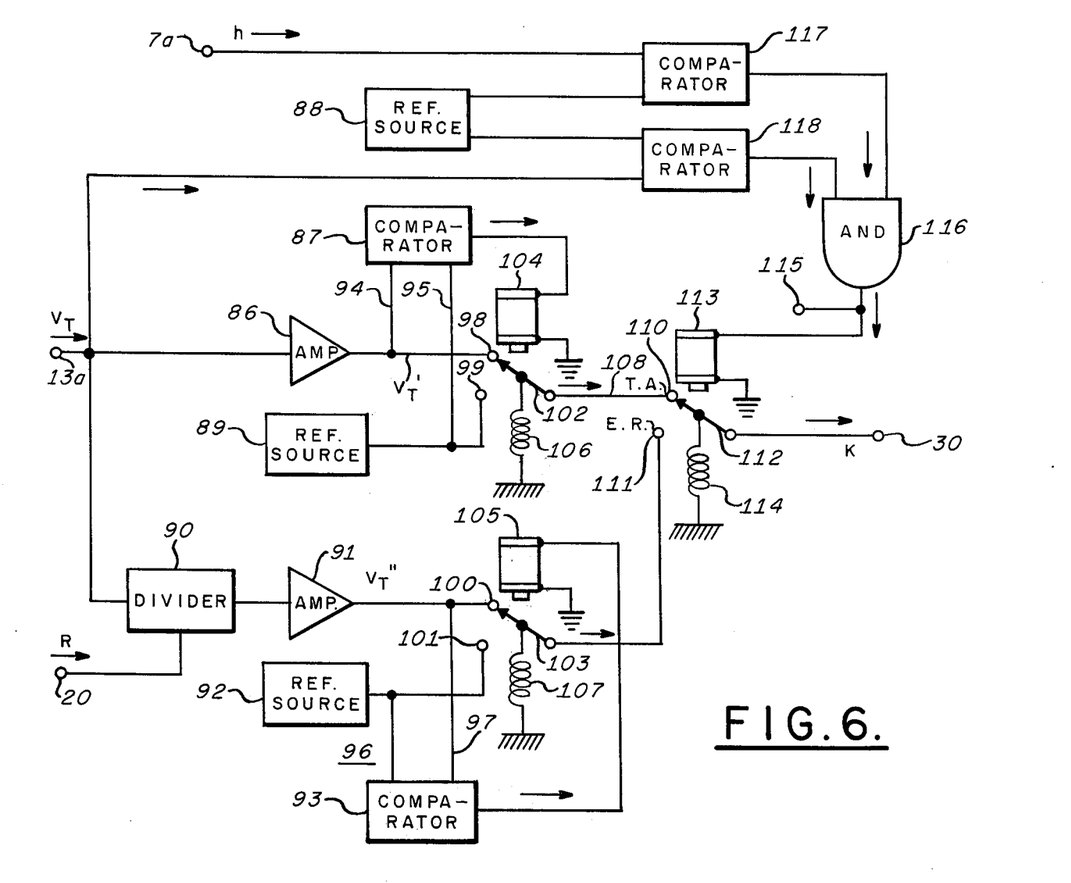
FIG. 6 is a detailed wiring diagram of the computer 23 of FIG. 1.

The $V_{TN}$, $V_{TE}$ computer 16, which will be described in further detail in connection with FIG. 5, is furnished with a signal representing aircraft true speed $V_T$ from true air speed meter 4 via lead 13 and a signal representing craft magnetic heading via lead 14 from compass 5, which is typically a magnetic compass employing a conventional flux valve earth's magnetic field sensor. The craft true air speed $V_T$ signal is also coupled via lead 13a to K computer 23. The K computer 23 is further supplied with a signal representing craft ground distance R from the $E_{AR}$, $N_{AR}$ computer 15.

Additional important novel elements in the present invention for reducing the effects of prior art errors include the respective north and east complementary filters 26 and 27 which elements 26 and 27 will be further discussed in connection with FIG. 7. The north complementary filter 26 receives a craft magnetic north velocity signal $V_{TN}$ on lead 18 from computer 16 and a northerly ground distance signal $N_{AR}$ on lead 17 from computer 15, as well as the computer K signal via lead 24 from K computer 23. In a generally similar manner, the east complementary filter 27 receives a craft magnetic east velocity signal $V_{TE}$ on lead 22 from computer 16 and a easterly ground distance signal $E_{AR}$ on lead 21 from computer 15. Also received by filter 27 is the computed K signal via lead 24a from K computer 23.

The various signals are converted in the north complementary filter 26 to provide the aircraft northerly position signal $N_{AC}$ on output terminal 28. In a similar manner, the several input signals flowing into the east complementary filter 27 are converted to form the easterly position signal $E_{AC}$ on output terminal 29. The final output at terminals 28 and 29 may be supplied by the respective leads 32 and 33 to the utilization device 31, which may be a conventional display such as a pair of electrical volt meters or counters or a cathode ray plan position display or the like. Utilization device 31 may include a computer for automatic guidance of the aircraft.

For continuing precise operation of the complementary filters 26 and 27 when the apparatus is being used in the dead reckoning mode, as in the absence of reliable radio outputs from one or the other or both of receivers 1 and 3, filters 26 and 27 are also supplied via leads 19, 25, and 25a with an indication of the state of reliability or validity of the radio signals. A unidirectional signal which may be a conventional automatic gain control voltage developed within VOR receiver 1 for conventional control purposes may be supplied for the new purpose via lead 6a to AND circuit 9. A second similar signal generated during proper operation of DME receiver 3 may be supplied by lead 8a to AND circuit 9. In the presence of both signals, AND circuit 9 yields an output on lead 19 indicating the validity of the radio data for use in filters 26 and 27, as will be explained with reference to FIG. 7.

Figure 4:
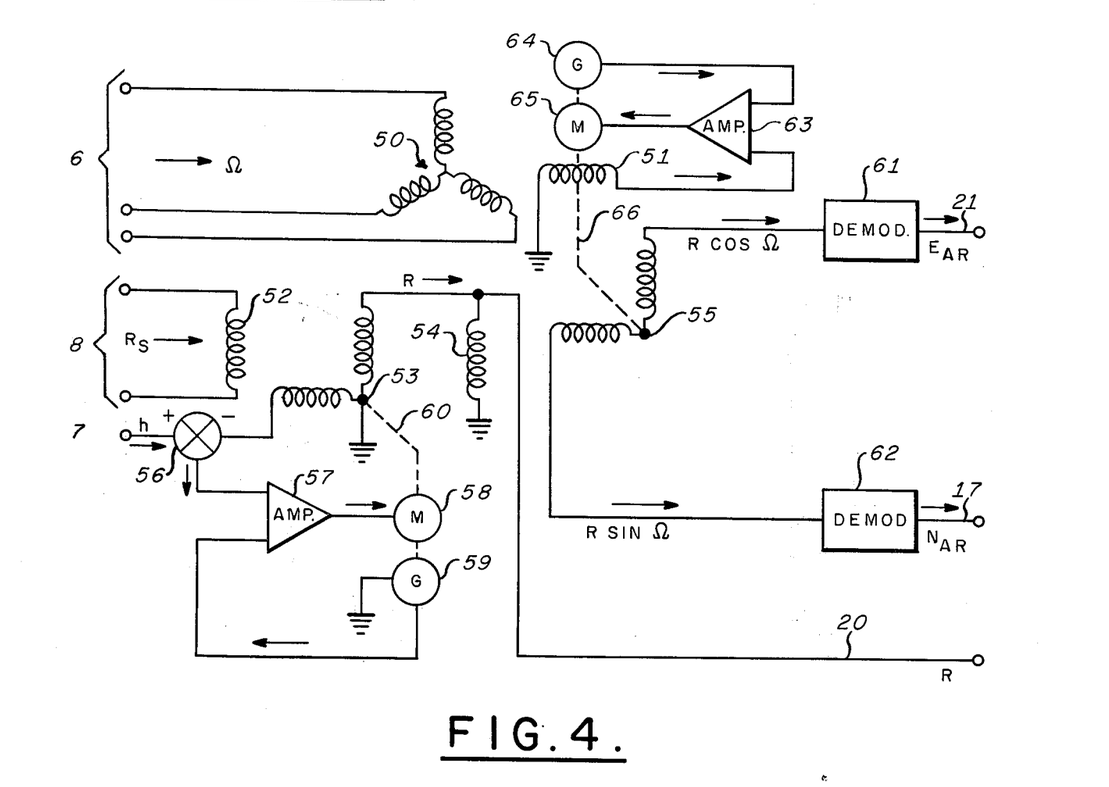
FIG. 4 presents a detailed wiring diagram of the computer 15 of FIG. 1.

FIG. 4 illustrates in detail the $E_{AR}$, $N_{AR}$ computer 15 of FIG. 1. Signals related to the craft radio bearing angle are applied via leads 6 in the form of electrical three-wire selsyn data voltages to the stator windings 50 of a conventional repeater selsyn 50–51. Any error voltage induced in the winding 51 of selsyn 50–51 is amplified by a conventional error amplifier 63 to drive the bearing servo motor 65 for repositioning mechanical link 66, which link 66 may include reduction gearing. Mechanical link 66 also drives a conventional tachometer generator 64 for supplying a rate input signal to a second terminal of servo amplifier 63 for the usual purposes. Mechanical link 66 also determines the position of the rotor 55 of a conventional resolver selsyn 54–55, as will be further discussed, the position of rotors 51 and 55 thus being related to the radio bearing angle.

An electrical signal proportional to the magnitude of craft altitude $h$ is coupled by lead 7 to a conventional summing circuit 56, poled as shown in FIG. 4; a second input to summing circuit 56 is received from selsyn rotor 53. Any differential output of summing circuit 56 is applied to the conventional servo amplifier 57, whose output drives the bearing servo motor 58 and the selsyn rotor 53 through the agency of mechanical linkage 60, which linkage 60 may include reduction gearing. Mechanical linkage 60 drives also a conventional tachometer generator 59 whose rate output is fed to a second input of servo amplifier 57 in the usual manner. The apparatus associated with selsyn 52–53 thus converts the voltage representing slant range $R_s$ supplied by leads 8 to selsyn stator 52 into a voltage proportional to aircraft ground range R, which is thereupon coupled across the aforementioned selsyn stator 54. In consequence of the controlled positioning of selsyn rotors 51 and 55, the output signals of rotor 55 respectively represent the components R cos and R sin and these voltages are respectively demodulated by demodulators 61 and 62. In this manner, electrical signals proportional in amplitude to northerly aircraft ground range $N_{AR}$ and easterly aircraft ground range $E_{AR}$ appear on the respective output lead terminals 17 and 21. Also, a voltage proportional to aircraft ground range R is found on lead 20.

Additional electrical signals required in the computation are formed in the $V_{TN}$, $V_{TE}$ computer 16 as shown in further detail in FIG. 5. The signals related to the compass heading angle are applied via leads 14 in the form of electrical three-wire selsyn data voltages to the stator windings 70 of a conventional repeater selsyn 70–71. Any error voltage induced in the winding 71 of selsyn 70–71 is amplified by a conventional error amplifier 74 to drive the heading servo motor 76 for repositioning the mechanical link 77, which link 77 may include reduction gearing. Mechanical linkage 77 also drives tachometer generator 75 for supplying a rate input voltage to a second terminal of servo amplifier 74 for the usual purpose. Mechanical linkage 77 also determines the angular position of the rotor 73 whose stator 72 is supplied by leads 13 with a voltage proportional to true air speed $V_T$. Thus, rotor 73 of selsyn 72–73 provides at its respective outputs signals proportional to $V_T$ cos and $V_T$ sin for individual application to demodulators 78 and 79. In turn, the useful voltages appearing on the output leads 18 and 22 of the demodulators are signals representing the amplitudes of northerly true velocity $V_{TN}$ and easterly true velocity $V_{TE}$.

The K computer 23 of FIG. 1 is a significant feature of the novel navigation system and will be described in detail with reference to FIG. 6, where its primary inputs are seen to be true air speed $V_T$, ground range R from the $E_{AR}$, $N_{AR}$ computer 15 and craft altitude $h$. The true air speed input $V_T$ at input lead terminal 13a may flow through one or the other of two primary paths in forming the useful output K at output lead terminal 30. A first path, when switches 102 and 112 are in the positions shown in FIG. 6, is through amplifier 86, which may be a low gain buffer amplifier to form the signal $V_T$, which latter signal may then pass through switches 102 and 112 to lead terminal 30. In a second path, the $V_T$ signal is applied to the conventional amplitude divider 90, to a second input of which is coupled the ground range signal R. The ratio signal $V_T/R$ thus forward, after application to low gain buffer amplifier 91, yields the signal $V_T$ which may be coupled through switches 103 and 112 to terminal 30.

In the alternative positions of switches 102 and 103, certain fixed reference voltages are employed in place of the varying analog voltages derived from the $V_T$ signal or from the $V_T$ and R signals. For this purpose, the $V_T$ output of amplifier 86 is supplied to a conventional comparator 87 via lead 94, while a reference voltage from a conventional reference voltage source 89 is also coupled via lead 95 to that same comparator 87. If voltage $V_T$ is greater than a predetermined value actually selected, according to the invention, to equal the reference voltage of source 89, the comparator 87 then energizes relay solenoid 104 so as to hold switch 102 in the indicated position, thus permitting the higher output voltage of amplifier 86 to flow to switch terminal 110. If signal $V_T$ drops in amplitude below the same reference voltage, solenoid 104 is de-energized and spring 106 pulls switch 102 down to the contact 99; the fixed voltage level from reference voltage source 89 is then coupled by switch 102 to the switch terminal 110.

As observed in the foregoing paragraph, a certain fixed reference voltage is employed in place of the variable voltage derived by amplitude divider 90 and buffer amplifier 91 in particular circumstances. For this purpose, the $V_T$ signal output of amplifier 91 is supplied to a conventional comparator 93 via lead 97, while a particular reference voltage from the conventional reference source 92 is coupled via lead 96 to the same comparator 93. If voltage $V_T$ is greater than a predetermined value actually selected, according to the invention, to be equal to the reference voltage supplied by source 92, the comparator 93 energizes the relay solenoid 105 so as to hold switch 103 in the position shown in FIG. 6. Thus, the higher voltage output of amplifier 91 is permitted to flow to terminal 111 of switch 112. If the amplitude of the signal $V_T$ falls below that reference voltage, the solenoid 105 is de-energized, whereupon spring 107 pulls switch 103 down to to the contact 101. The predetermined fixed voltage level of voltage source 92 is then coupled by switch 103 to the terminal 111 of switch 112.

In the instance of a representative model of the K computer circuit of FIG. 6, the reference voltage sources 89 and 92 supply stable reference signals of 0.040 and 0.025 volts, respectively. If $V_T$ 0.040, switch 102 is on contact 98; if $V_T$ ≤ 0.040 volts, switch 102 is on contact 99.

In a generally similar way, if $V_T$ 0.025 volts, switch 103 is in contact 100; if $V_T$ ≤ 0.025 volts, switch 103 moves to contact 101. It is thus seen that, when the equipment is operating, the voltage level at terminal 110 of switch 112 can never fall below 0.040 volts and is generally above that value for the higher values of true air speed $V_T$. Furthermore, the voltage level at terminal 111 never falls below 0.025 volts, and is generally above that level for the higher regime of values of $V_T$. Accordingly, the value of K is either 0.025 volts or greater or is 0.040 volts or greater, depending on the prevailing condition of switch 112.

Of course, the position of switch 112 with respect to terminals 110 and 111 may be selected manually, the human pilot making the selection in terms of enroute flight conditions or proximity to the radio guidance station. However, it is preferred that switch 112 be operated automatically. For this purpose, it is assumed that craft altitude and air speed will both be large for enroute flight. Only when both parameters drop below predetermined values will it be indicated that a terminal area is being approached and that landing is anticipated, for example. Thus, for air speeds above 250 knots and altitudes above 10,000 feet, for example, it will be assumed that enroute flight is involved. Conversely, for air speeds below 250 knots and altitudes below 10,000 feet, terminal area navigation is involved. Accordingly, switch 112 is automatically moved to the T.A. terminal 110 for terminal area flight and to the E.R. terminal 111 for enroute flight.

The position of switch 112 with respect to the respective T.A. and E.R. contacts 110 and 111 is determined automatically by relay solenoid 113 and spring 114 and by an appropriate control signal. The air speed voltage $V_T$ on lead 13a is coupled as one input to a conventional comparator 118, while the craft altitude signal h on lead 7a is supplied to a second conventional comparator 117. Both comparators may be supplied with particular and appropriate reference voltages from reference source 88. If craft altitude $h$ is below the predetermined value, there is a significant output from comparator 117; if craft air speed $V_T$ is below a certain value, there is a significant output from comparator 118. When outputs from both comparators 117 and 118 are present, the AND circuit 116 yields an output for exciting relay solenoid 113, holding switch 112 in the position shown in the figure against T.A. contact 110. If one or both of comparators 117 and 118 fail to yield an output, enroute flight is involved and switch 112 is pulled downward by spring 114 so as to cover the E.R. contact 111. Accordingly, the amplitude of the gain-controlling signal K at terminal 30 is determined for the various conditions and modes of flight in terms of craft air speed $V_T$, craft altitude $h$, ground range R. It will be recognized by those skilled in the art that the apparatus of FIG. 6 represents only one particular solution to the analog problem of solving for the gain parameter under the various flight regimes and that other instrumentations may be employed. In particular, the relay or solenoid controlled switches 102, 103 and 112 may be replaced by other known alternative switching devices. By way of further example, the several reference voltage sources 88, 89, 92 may be supplied in common by a unitary circuit. Also switches 102, 103 and 112 may be supplied that respond to alternative kinds of comparator outputs with the same desired result as required for proper operation of the invention.

The apparatus so far described has the function of generating signals for use in effecting computations of northerly computed aircraft position $N_{AC}$ and easterly computed aircraft position $E_{AS}$ for output on leads 28 and 29 of FIG. 1, where these computations are made in the active north complementary filter 26 and the active east complementary filter 27. Devices 26 and 27 each use similar operating principles and apparatus and it will be obvious to those skilled in the art that the structure and function of both may readily be understood by a description of only one of them. By way of example, devices 26 and 27 will be explained in FIG. 7, which, as illustrated, is concerned with a closed loop, adjustable gain servo computer for production of the northerly aircraft position signal generated by device 26.

Figure 7:
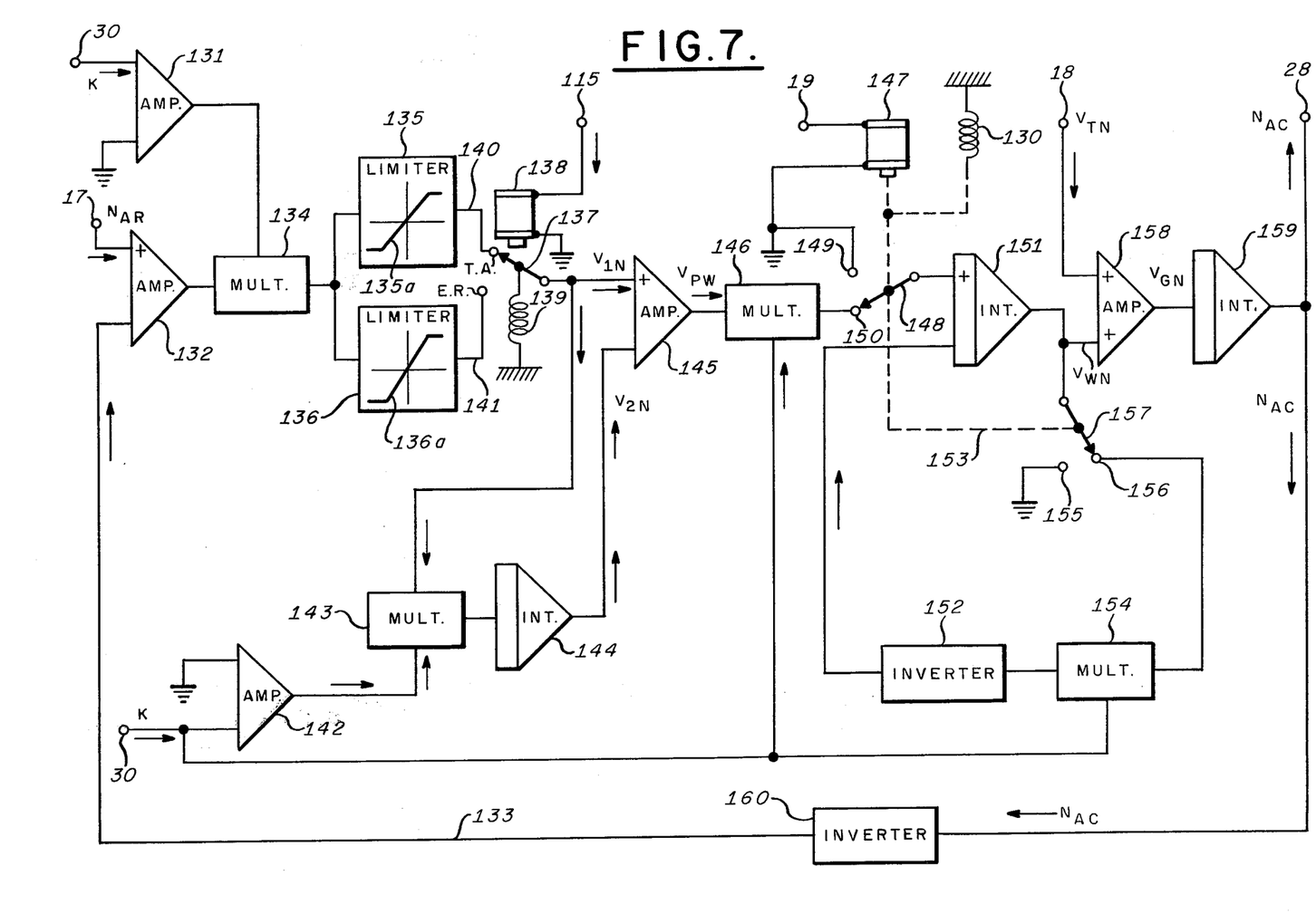
FIG. 7 is a detailed wiring diagram of the apparatus used in the complementary filters 26 and 27 of FIG. 1.

In FIG. 7, the northerly aircraft ground range signal $N_{AR}$ on lead 17 is coupled as one input to a non-inverting unity-gain amplifier 132, whose second input, poled as illustrative, is supplied by a feed back lead 133, as will be explained. A second input to the apparatus of FIG. 7 is the adjustable gain parameter K signal on lead 30 which is supplied to a buffer amplifier 131 having a gain, for example, of 0.5. The amplitudes of the outputs of amplifiers 131 and 132 are multiplied to form a product signal in the conventional amplitude multiplier 134. The output of multiplier 134 branches, being fed to similar parts of a selective limiter system.

The limiter system consists of two symmetric limiters 135 and 136 situated in parallel circuits and having the respective limiter characteristics curves 135a and 136a. LImiters 135 and 136 respond in proportion to their inputs over symmetric ranges with respect to 0 volts. Limiter 135 actively limits, for example, at 25 knots equivalent aircraft speed and limiter 136 at 50 knots; such error limiting greatly reduces the adverse effects of large random errors often present in the radio data. One or the other of the limiter outputs is used in the system according to the position of switch 137 with respect to output leads 140 and 141. For terminal area navigation, switch 137 is connected to the T.A. lead 140; but for enroute operation, switch 137 is connected to E.R. output lead 141. The output of the AND circuit 116 of FIG. 6 on lead 115 may be used in FIG. 7 to operate solenoid 138 for placing switch 137 in the T.A. position indicated in FIG. 7. In the absence of excitation of solenoid 138, switch 137 will be urged into its E.R. position by spring 139.

Accordingly, an amplified and limited version of the northerly aircraft ground range signal is thus supplied to branching paths, a first path supplying that signal directly to one input of a non-inverting unit gain buffer amplifier 145 having a second input and polarized as indicated. For forming the second input, the adjustable gain parameter signal K is applied to a buffer amplifier 142 having a gain, for example, of 0.1. The attenuated output of amplifier 142 is supplied to a conventional analog amplitude multiplier 143 whose second input is the amplified and limited $N_{AR}$ signal found at the output of switch 137. The product of the K parameter signal and the modified $N_{AR}$ signal is supplied by multiplier 143 to a conventional non-inverting integrator circuit 144 whose time integrated output is, in turn coupled to amplifier 145. The summation output of amplifier 145 is coupled to a conventional analog amplitude multiplier 146 wherein it is multiplied in amplitude by a direct version of the adjustable gain parameter K provided on lead 30. In this manner, a pseudo-wind voltage is supplied, for instance, through contact 150 and switch 148 to an integrator 151 poled as indicated in the drawing.

Integrator 151 is a conventional non-inverting integrator similar to integrator 144, but having two inputs; it forms a primary element in a closed loop circuit including multiplier 154 and inverter 152 and performs the general function of a low pass filter. The time integrated output of integrator 151 passes through switch 157 and contact 156 to the conventional analog amplitude multiplier 154, whose second input is the adjustable gain parameter K supplied directly from lead 30. The integrated and multiplied output of multiplier 154 passes through inverter 152, which may be a unity-gain inverting amplifier, to the aforementioned second input of integrator 151. Thus, integrator 151, in the normal presence of the radio inputs, generates at its output a derived estimate of the northerly wind component for supply to amplifier 158 and which is fed back through circuits 154 and 152 to the input of integrator 151.

As previously mentioned in connection with FIG. 1, a signal indicating the presence of useful VOR and DME signals at the respective outputs of VOR receiver 1 and DME receiver 3 is placed on lead 19 for use in filters 26 and 27. With such a signal present on lead 19 in FIG. 7, solenoid 147 is energized and the switches 148 and 157 are held in the positions shown in the figure. Should one or the other of the radio transmissions fail to produce useful receiver outputs, solenoid 147 is deenergized and spring 130 pulls switches 148 and 157 to their respective grounded terminals 149 and 155. Thus, the loop including integrator 151 is isolated from both of its inputs, its principal input and its feed back circuits, being rendered ineffective. In such a circumstance, integrator 151 remembers the previously computed value of the northerly wind signal, and is operating in its dead reckoning mode. When useful radio signals return, the solenoid 147 moves switches 148 and 157 to their original positions contacting terminals 150 and 156.

The integrated output of circuit 151 is applied as one input to the summing amplifier 158, to a second input of which is coupled the aircraft northerly true air speed voltage $V_{TN}$ on lead 18, amplifier 158 being polarized as shown. The summation output of amplifier 158, which may be a non-inverting unity-gain buffer amplifier, is supplied to the non-inverting integrator 159 and represents aircraft northerly ground speed $V_{GN}$. Integrator 159 permits the system to operate without substantial errors due to steady state winds. The time integrated output of integrator 159 is one of the two desired outputs of the system, aircraft northerly computed position $N_{AC}$, and it appears on output lead 28. For enabling its continued computation, the $N_{AC}$ signal is fed back through inverter 160, which may be a unity-gain inverting amplifier, via lead 133 to the second input of amplifier 132. It will again be noted by those skilled in the art that alternative components may be employed in the apparatus of FIG. 7; only by way of example, the switching mechanisms associated with switches 137, 148, and 157 may be replaced by other known switching arrangements.

As noted above, the structures and operation of the respective north and east complementary filters 26 and 27 are similar and the structure and operation of filter 27 will be evident to those skilled in the art from the foregoing discussion of the structure and operation of filter 26. It will, of course, be evident from FIG. 1 that the inputs to filter 27 are necessarily $V_{TC}$, $E_{AR}$, K, and the radio validity signals of lead 12, whereas the inputs used in filter 26 are necessarily $N_{AR}$, $V_{TN}$, K, and the same radio validity signal.

Thus, FIG. 7 represents a complementary filter system made up of precise, readily available components for generating the respective north and east position signals $N_{AC}$, $E_{AC}$ representing the position of the aircraft relative to the radio guidance transmitter. Referring particularly to FIG. 7, it shows that the input northerly ground range $N_{AR}$ signal is derived from radio data. This ground range $N_{AR}$ signal is compared with the computed aircraft north position $N_{AC}$ signal on lead 133 to develop an error signal. The error signal is amplified at a gain set at 0.5K and is limited between symmetric positive and negative values. Since the parameter K has the dimensions of radians per second, the limited signal has the dimensions of a velocity. The limited signal $V_{1N}$ is amplified at a gain set at 0.1K and is then integrated and summed with itself to generate a pseudo-north wind signal $V_{PN}$. The latter signal $V_{NP}$ is fed to the input of the low pass filter including integrator 151, that filter being constructed so as to have a break frequency of K radians per second.

The output of that filter is derived at the output of integrator 151 and is a voltage $V_{WN}$ representing a derived estimate of the north component of wind. The voltage $V_{WN}$ is then combined with the north component of $V_{TN}$ of the craft true air speed in amplifier 158 to obtain an estimated ground speed $V_{GN}$ signal. The ground speed $V_{GN}$ signal is coupled to the third integrator 159, the output of which is representative of the computed north position $N_{AC}$ of the aircraft. Under ideal conditions, the derived or estimated north component $V_{GN}$ of ground speed is accurate and therefore constitutes a precise measure of the rate of change of computed north position $N_{AC}$. Integration of the derived north component $V_{GN}$ is integrator 159 will then produce a signal value representing computed north position $N_{AC}$ which is accurate.

If the computed north position $N_{AC}$ signal does not agree with the northerly ground range $N_{AR}$ signal at the input to amplifier 132, an error is present which may be assumed to be due to an improperly estimated wind magnitude $V_{WN}$. According to the present invention, the error signal will produce a new value of the output signal $W_{1N}$ from the selected limiter which, in turn, produces a new estimate of the wind signal $V_{WN}$ which, in turn, produces a corrected estimation of craft ground speed $V_{GN}$. The direct input of the limited signal $V_{1N}$ amplifier 145 has the effect of producing a ground speed change due to wind shear while the $V_{1N}$ signal integrated by integrator 144 provides the input to the amplifier 145 and the low pass filter including integrator 151 needed to support generation of a steady state wind voltage $V_{WN}$ without requiring any difference between the input $N_{AR}$ and output $N_{AC}$ signals. As those skilled in the art will recognize, it is required that the initial conditions be set into the various integrators in the conventional manner.

The described preferred embodiment of the invention utilizes complementary filters 26 and 27 wherein the gain parameter K and the selected limit value imposed by limiters 135 or 136 is a function of craft true air speed $V_T$ and the distance R of the craft from the guidance transmitter. In the typical practical examples previously selected, and for terminal area operation:

$$K = 0.27 \tfrac{1}{4} 10^{-3} (V_T) \qquad (1)$$

in radians per second, where $V_T$ is in knots. The value of K is limited to a minimum value 0.040 radians per second corresponding to a 148 knot air speed. Also, the limits of signal $V_{1N}$ are set at 25 knots for the terminal area. For enroute operation:

$$K = \frac{5 \tfrac{1}{4} 10^{-3} V_T}{R} \qquad (2)$$

in radians per second, where $V_T$ is in knots and R in nautical miles. The value of K is limited to a minimum value of 0.025 radians per second. Also, the limits of signal $V_{1N}$ are set at 50 knots for enroute operation.

As noted previously, the values of K and the limiting levels $V_{LIM}$ imposed on signal $V_{1N}$ are, according to the invention, made functions of craft speed $V_T$ and distance R. First, the frequency spectrum of the random error of the output of VOR receiver 1 is a function of the variables $V_T$ and R and, accordingly, the frequency responses of the complementary filters 26, 27 are made compensating functions of these same variables so as to afford optimum over-all low frequency response of the system. Optimum low frequency response is required of filters 26, 27 because it is this type of response that yields accurate servo tracking of the system in the presence of changing wind. For providing accurate tracking in the presence of wind shear, a large value of the gain parameter K is desirable, but general use of large values of K allows more of the input randomness to reach the derived ground speed and position outputs. Therefore, the value of K is selected as an optimum trade-off value, balancing accuracy of wind tracking against accurate position computation. The value of $V_{LIM}$ is selected as the minimum value which will allow the filters 26, 27 to track the maximum wind shear expected to be encountered in the prevailing mode of flight.

In the terminal area, the magnitude of the VOR receiver error is small and the function of K is chosen to minimize errors due to wind shear. Under en route conditions, on the other hand, the aircraft will generally be operating at large distances R from the radio guidance station and thus in regions in which the VOR errors are large and the function of K is then selected to maximize the filtering of the randomness of the input.

It is evident by inspection of the foregoing analysis that the instrumentation of the invention may be accomplished using other techniques than used in the illustrated embodiment, including using a cooperative assembly of known digital data processing or computing circuits. For example, the several operations involve simple arithmetic operations such as addition, subtraction, multiplication, and integration. Many examples of digital computation elements are available in the prior art for accomplishing such computer operations and it is readily appreciated that they may be coupled together in cooperative relation for attaining the presently desired results. It is furthermore evident that a conventional general purpose digital or analog computer may be employed at least in part for the purposes of the invention. It is well within the ordinary skill of the digital computer programmer to process the operations above, to create flow charts, and to translate the latter into computer routines and sub-routines for solution of such problems along with generating a compatible computer language for processing input data and instructions to produce outputs directly useful for application, for example, in a standard display or other utilization device as presently required.

The present invention supplies a much needed solution to the need for precise and reliable enroute and terminal area navigation of aircraft, though not being limited to area navigation since it is applicable to any type of radio navigation problem wherein the conventional VOR and DME transmissions are used to determine craft location. According to the invention, a navigation computing system including a gain controlling mechanism and a pair of complementary filter sub-systems is provided which accurately compares computed position data derived primarily from integration of components of craft true air speed and wind data to input radio position data to develop an error signal. The observed error is used to revise the derived wind data and to keep the positional output data in a currently accurate state. The effect or authority of the error on the computer loop is made directly proportional to craft air speed and inversely proportional to distance of the craft from the radio guidance transmitter system, maintaining optimum data filtering while the craft is enroute, while limiting the error signal reduces the effects of large random errors which may be present in radio data. In the vicinity of the terminal area, the control is converted to be a function only of craft air speed for optimum system performance in that area.

While the invention has been described in its preferred embodiments, it is to be understood that the words which have been used are words of description rather than of limitation and changes within the purview of the appended claims may be made without departure from the true scope and spirit of the invention in its broader aspects.

We claim:

1. In a navigation computer:
    signal input means for developing a difference signal with respect to a radio derived signal representing a component of range and a signal representing a computed value of said component of range,
    first multiplier means for selectively multiplying said difference signal by a signal representing craft true air speed to form a velocity component signal,
    means for summing said velocity component signal and the time integrated value thereof to form a first composite velocity signal,
    first integrator means for time integrating said first composite velocity signal along with a signal proportional to the output of said first integrator means,
    summation means responsive to said first integrator means and to a signal representing a component of craft true air speed for forming a second composite velocity signal,
    second integrator means for time integrating said second composite velocity signal for forming said signal representing said computed value of said component of range and,
    coupling means for feeding said signal representing said computed value of said component of range back to said signal input means for developing said difference signal.

2. Navigation apparatus as described in claim 1 wherein said first multiplier means is additionally selectively adapted for multiplying said difference signal by an inverse function of a radio derived craft range signal.

3. Navigation apparatus as described in claim 1 wherein said means for summing said velocity component signal and the time integrated value thereof additionally comprises:
    second multiplier means responsive to said composit velocity component signal and selectively to a signal representing craft true air speed, and
    third integrator means responsive to said second multiplier means.

4. Navigation apparatus as described in claim 3 wherein said second multiplier means is additionally selectively adapted for multiplying said velocity component signal by an inverse function of a radio derived range signal.

5. Navigation apparatus as described in claim 1 additionally including third multiplier means directly responsive to said first composite velocity signal and selectively to said signal representing craft true aid speed.

6. Navigation apparatus as described in claim 5 wherein said third multiplier means is additionally selectively adapted for multiplying said composite velocity signal by an inverse function of a radio derived craft range signal.

7. Navigation apparatus as described in claim 1 wherein said first integrator means for time integrating said first composite velocity signal includes a selectable feed back path comprising in series:
    fourth multiplier means, and
    signal inverter means responsive to said fourth multiplier means.

8. Navigation apparatus as described in claim 7 wherein said fourth multiplier means is selectively responsive to said signal representing craft true air speed.

9. Navigation apparatus as described in claim 8 wherein said fourth multiplier means is selectively responsive to said signal representing an inverse function of a radio derived range signal.

10. Navigation apparatus as described in claim 1 additionally including limiter means responsive to said first multiplier means for limiting said velocity component signal selectively at first and second predetermined limiting values.

11. Navigation apparatus as described in claim 10 including comparator means responsive to a signal representing craft altitude and to a signal representing craft true air speed for selecting one of said first and second predetermined limiting values of said limiter means.

12. Navigation apparatus as described in claim 7 including switch means for rendering said feedback path ineffective in response to loss of radio navigation data.

13. Navigation apparatus as described in claim 12 wherein said switch means additionally opens the circuit between said first integrator means and said first composite velocity signal in response to loss of radio navigation data.

14. In an airborne radio navigation system:
    first computer means for computing easterly and northerly ground distances of an aircraft from a radio guidance transmitter system,
        said first computer means being jointly responsive to VOR receiver means, to DME receiver means, and to altimeter means,
    second computer means for computing craft true east and north velocity,
        said second computer means being jointly responsive to true air speed meter means and to azimuth compass means, first closed loop variable gain computer means for providing computed northerly position of said aircraft with respect to said radio guidance transmitter system, said first closed loop variable gain computer means being responsive to said northerly ground distance and to said craft northerly velocity, second closed loop variable gain computer means for providing the computed easterly position of said aircraft with respect to said radio guidance transmitter system, said second closed loop variable gain computer means being responsive to said easterly ground distance and to said craft easterly velocity, third computer means responsive to said first computer means, to said air speed meter means, and to said altimeter means for generating a third computer means output for controlling the gains of said first and second closed loop variable gain computer means.

15. Radio navigation apparatus as described in claim 14 wherein said third computer means output is selectively generated in a first mode of operation thereof in response to craft true air speed for values thereof greater than a first predetermined value and otherwise is said first predetermined value of said air speed.

16. Radio navigation apparatus as described in claim 15 wherein said third computer means output is selectively generated in a second mode of operation thereof in response to the ratio formed by craft true air speed divided by ground range of said aircraft from said radio guidance transmitter system when said ratio is greater than a second predetermined value and otherwise is said second predetermined value of said ratio.

17. Radio navigation apparatus as described in claim 16 wherein operation of said third computer means is in said first mode for terminal area craft navigation and in said second mode for enroute craft navigation.

18. Radio navigation apparatus as described in claim 16 including comparator means responsive to said altimeter means and to said craft true air speed means for selecting one of said first and second modes of operation of said third computer means.

19. Radio navigation apparatus as described in claim 16 wherein said first closed loop variable gain computer means comprises:

first input means for developing a difference signal between said northerly craft distance and said computed northerly distance of said aircraft with respect to said radio guidance transmitter system, first gain controlling means responsive to said first input means and to said third computer means output for forming a first velocity component signal, first means for summing said first velocity component signal and the time integrated value thereof to form a first composite velocity signal, first integrator means for time integrating said first composite velocity signal and a signal proportional to the time integrated output of said first integrator means, first summation means responsive to said first integrator means and to craft northerly true velocity for forming a second composite velocity signal, second integrator means for time integrating said second composite velocity signal for forming said signal representing a computed value of said northerly distance of said aircraft, first coupling means for feeding said signal representing said computed value of said northerly distance of said aircraft back to said first signal input means, utilization means responsive to said second integrator means.

20. Radio navigation apparatus as described in claim 19 wherein said second loop variable gain computer means comprises:

second input means for developing a difference signal between said easterly craft distance and said computed easterly distance of said aircraft with respect to said radio guidance transmitter system, second gain controlling means responsive to said second input means and to said third computer means output for forming a second velocity component signal, second means for summing said second velocity component signal and the time integrated value thereof to form a third composite velocity signal, third integrator means for time integrating said third composite velocity signal and a signal proportional to the time integrated output of said third integrator means, second summation means responsive to said third integrator means and to craft easterly true velocity in forming a fourth composite velocity signal, fourth integrator means for time integrating said fourth composite velocity signal for forming said signal representing a computed value of said easterly distance of said aircraft, second coupling means for feeding said signal representing said computed value of said easterly distance of said aircraft back to said second signal input means, said utilization means being additionally responsive to said fourth integrator means.

21. Radio navigation apparatus as described in claim 20 wherein said first and second means for summing said respective first and second velocity component signals and said respective time integrated values thereof each comprise:

first and second multiplier means responsive to a respective one of said first and second velocity component signals and both to said third computer means output, and fifth and sixth integrator means respectively responsive to said first and second multiplier means.

22. Radio navigation apparatus as described in claim 21 additionally including third and fourth multiplier means respectively responsive to said first and second composite velocity signals and to said third computer output.

23. Radio navigation apparatus as described in claim 22 wherein said first and third integrator means respectively for time integrating said first and third composite velocity signals respectively include selectable feed back paths comprising in series:

fifth or sixth multiplier means, and first or second inverter means, respectively responsive thereto, said fifth and sixth multiplier means being respectively responsive to said third computer means output.

24. Radio navigation apparatus as described in claim 23 additionally including first and second limiter means respectively responsive to said first and second gain controlling means for limiting said first and second velocity component signals selectively at respective first and second predetermined limiting values.

25. Radio navigation apparatus as described in claim 14 wherein said computer means for computing easterly and northerly ground distances of an aircraft comprises:
- means for computing craft ground range R from the radio guidance computer from radio derived slant range $R_s$ of the aircraft with respect to the radio guidance transmitter,
- means for computing the sine and cosine of radio bearing of the aircraft with respect to north,
- means for computing R cos and R sin , and demodulator means respectively converting values of R cos and R sin into said easterly and northerly ground distances of said aircraft $E_{AR}$ and $N_{AR}$.

26. Radio navigation apparatus as described in claim 14 wherein said computer means for computing craft east and north true velocity comprises:
- means responsive to said air speed meter and to said azimuth compass means for providing signals representing craft true air speed $V_T$ and craft compass heading ,
- means for generating signals representative of the sine and cosine of craft compass heading ,
- means for computing $V_T$ cos and $V_T$ sin , and
- demodulator means respectively converting values of $V_T$ cos and $V_T$ sin into said craft magnetic north and magnetic east velocities $V_{TN}$ and $V_{TE}$.

27. A navigation computer for aircraft for providing an output signal proportional to at least one direction component of craft position relative to a radio transmitter station, the combination comprising,
- means including radio receiver means for providing a first signal proportional to a direction component of craft position relative to said station,
- means for providing a second signal proportional to the integral of the craft velocity component corresponding in direction to said position component,
- means responsive to said first and second signals for providing a resultant signal proportional to the error therebetween, said error signal including undesirable high frequency signal components of said first signal and also including further desirable signal components proportional to the integral of changing wind velocities parallel to said direction components,
- low pass filter means responsive to said error signal for blocking said high frequency components and passing said low frequency and wind components,
- summing means responsive to said second signal and the output of said filter means for modifying said first signal in a sense to reduce said error signal toward zero and for supplying said output signal, and
- further integrator means responsive to said error signal for supplying an output to said filter means proportional to said steady state wind components whereby to permit said error signal to go to zero under steady state wind conditions.

28. A computer as described in claim 27 including limiter means responsive to said resultant signal proportional to error for limiting the magnitude thereof whereby to suppress large signal transients.

29. A computer as described in claim 28 wherein said further integrator means has series coupled variable gain input means having a gain controlled in proportion to true craft air speed.

30. A computer as described in claim 27 wherein said low pass filter means includes integrator means with variable gain feed back means having a gain controlled in proportion to true craft air speed.

* * * * *